(12) United States Patent
Do

(10) Patent No.: US 10,435,929 B2
(45) Date of Patent: Oct. 8, 2019

(54) ADJUSTABLE PRESSURE RELIEF LATCH

(71) Applicant: Arconic Inc., Pittsburgh, PA (US)

(72) Inventor: Thai Do, Laguna Niguel, CA (US)

(73) Assignee: Arconic Inc., Pittsburgh, PA (US)

( * ) Notice: Subject to any disclaimer, the term of this patent is extended or adjusted under 35 U.S.C. 154(b) by 449 days.

(21) Appl. No.: 15/245,332

(22) Filed: Aug. 24, 2016

(65) Prior Publication Data

US 2017/0058582 A1 Mar. 2, 2017

Related U.S. Application Data

(60) Provisional application No. 62/210,135, filed on Aug. 26, 2015.

(51) Int. Cl.
*E05C 19/04* (2006.01)
*E05B 15/04* (2006.01)
(Continued)

(52) U.S. Cl.
CPC .............. *E05C 19/04* (2013.01); *B64D 29/06* (2013.01); *E05B 15/04* (2013.01); *E05B 51/023* (2013.01);
(Continued)

(58) Field of Classification Search
CPC . B64D 29/06; E05C 19/04; E05C 1/06; E05C 19/02; E05C 19/06; E05B 15/0205;
(Continued)

(56) References Cited

U.S. PATENT DOCUMENTS 1,206,342 A  11/1916 Linborg
2,712,955 A   7/1955 Andrews
(Continued)

FOREIGN PATENT DOCUMENTS

CN      1307166 A    8/2001
CN   206000291 U    3/2017
(Continued)

OTHER PUBLICATIONS

Aerospace Latching Systems, Alcoa Fastening Systems, http://www.alcoa.com/fastening_systems/aerospace/en/product.asp?cat_id=213&prod_id=500,pp. 11-2, 159-60, and i-iii (8 pages).
(Continued)

*Primary Examiner* — Kristina R Fulton
*Assistant Examiner* — Faria F Ahmad
(74) *Attorney, Agent, or Firm* — Greenberg Traurig, LLP

(57) ABSTRACT

A latch including a housing having side members each having an elongated slot, a bolt mounted rotatably to the housing and positioned between the side members of the housing, an adjustment mechanism, and a pin and roller positioned slidably within the elongated slots of the side members of the housing. The adjustment mechanism includes a compression spring, a central cap for receiving the pin and roller therethrough, and a nut for adjusting the load on the compression spring. The bolt is moveable between a first, closed position, in which the pin and roller are engaged with the bolt, and a second open position, in which the pin and roller are disengaged from the bolt. The latch can be opened automatically when a defined load, as adjusted by the adjustment mechanism, is provided on the bolt to disengage the pin and roller from the bolt.

18 Claims, 3 Drawing Sheets

(51) Int. Cl.
*E05B 51/02* (2006.01)
*B64D 29/06* (2006.01)
*E05B 63/00* (2006.01)
*E05C 19/06* (2006.01)

(52) U.S. Cl.
CPC ........ *E05B 63/0056* (2013.01); *E05C 19/063* (2013.01); *E05B 2015/0441* (2013.01); *E05B 2015/0448* (2013.01); *E05B 2015/0496* (2013.01); *Y10T 292/0909* (2015.04); *Y10T 292/0969* (2015.04); *Y10T 292/0997* (2015.04); *Y10T 292/108* (2015.04); *Y10T 292/1043* (2015.04); *Y10T 292/1075* (2015.04); *Y10T 292/1083* (2015.04); *Y10T 292/1089* (2015.04); *Y10T 292/14* (2015.04); *Y10T 292/216* (2015.04); *Y10T 292/444* (2015.04)

(58) Field of Classification Search
CPC .... E05B 13/10; E05B 65/1026; E05B 65/102; E05F 1/002; E05F 1/006; Y10T 292/14; Y10T 292/1043; Y10T 292/1075; Y10T 292/1089; Y10T 292/0969; Y10T 292/0997; Y10T 292/0909; Y10T 292/444; Y10T 292/216; Y10T 292/108; Y10T 262/1083
USPC ......... 292/252, 194, 195, 207, 163, 175, 93, 292/304, 256.69, 200, 202, DIG. 4, 292/DIG. 60, DIG. 65, DIG. 61, DIG. 49; 244/129.4, 129.5
See application file for complete search history.

(56) References Cited

U.S. PATENT DOCUMENTS

| | | | |
|---|---|---|---|
| 2,726,889 | A | 12/1955 | Lawson |
| 2,904,141 | A | 9/1959 | Henrichs |
| 2,927,812 | A | 3/1960 | Smith et al. |
| 2,944,848 | A | 7/1960 | Mandolf |
| 3,070,395 | A | 12/1962 | Morrison et al. |
| 3,259,411 | A | 7/1966 | Griffiths |
| 3,259,412 | A | 7/1966 | Wheeler |
| 3,341,239 | A | 9/1967 | Wheeler |
| 3,347,578 | A | 10/1967 | Sheehan et al. |
| 3,473,693 | A | 10/1969 | Fritz |
| 3,917,327 | A | 11/1975 | Plasko |
| 4,053,177 | A | 10/1977 | Stammreich et al. |
| 4,099,751 | A | 7/1978 | Poe et al. |
| 4,116,479 | A | 9/1978 | Poe |
| 4,130,307 | A | 12/1978 | Poe et al. |
| 4,183,564 | A | 1/1980 | Poe |
| 4,220,364 | A | 9/1980 | Poe |
| RE31,935 | E | 7/1985 | Poe |
| 4,530,529 | A | 7/1985 | Poe et al. |
| 4,538,843 | A | 9/1985 | Harris |
| 4,602,812 | A | 7/1986 | Boume |
| 4,641,868 | A | 2/1987 | Miron |
| 4,715,201 | A | 12/1987 | Craig |
| 4,826,221 | A | 5/1989 | Harmon |
| 4,828,299 | A * | 5/1989 | Poe ...................... E05B 63/128 292/139 |
| 4,858,970 | A | 8/1989 | Tedesco et al. |
| 4,911,488 | A | 3/1990 | Brackmann et al. |
| 5,152,926 | A | 10/1992 | Brown |
| 5,228,730 | A | 7/1993 | Gokcebay et al. |
| 5,341,752 | A | 8/1994 | Hambleton |
| 5,609,373 | A | 3/1997 | Gromotka |
| 5,620,212 | A | 4/1997 | Bourne et al. |
| 5,660,295 | A | 8/1997 | Hroma et al. |
| 5,664,813 | A | 9/1997 | Gromotka |
| 5,765,883 | A * | 6/1998 | Dessenberger ........ B64D 29/06 292/240 |
| 5,984,382 | A | 11/1999 | Bourne et al. |
| 6,123,370 | A | 9/2000 | Rozema et al. |
| 6,343,815 | B1 | 2/2002 | Poe |
| 6,361,090 | B1 | 3/2002 | Fan |
| 6,513,841 | B1 * | 2/2003 | Jackson ................ B64D 29/06 292/126 |
| 6,755,448 | B2 | 6/2004 | Jackson et al. |
| 6,913,297 | B2 | 7/2005 | Jackson et al. |
| 7,029,038 | B2 | 4/2006 | Kobrehel |
| 7,156,429 | B2 | 1/2007 | Eriksson |
| 7,504,601 | B2 | 3/2009 | Belmond et al. |
| 7,857,362 | B2 | 12/2010 | Deblock |
| 8,113,551 | B2 * | 2/2012 | Baic .................... E05B 15/0006 292/109 |
| 8,479,543 | B2 | 7/2013 | Yang et al. |
| 8,646,819 | B2 | 2/2014 | Do et al. |
| 8,727,390 | B2 | 5/2014 | Do |
| 8,740,147 | B2 * | 6/2014 | Defrance ............... B64D 29/06 244/129.4 |
| 8,864,185 | B2 * | 10/2014 | Do ........................ B64C 1/1446 292/105 |
| 8,919,829 | B2 * | 12/2014 | Hernandez ............. B64D 29/06 292/228 |
| 9,120,577 | B1 * | 9/2015 | Baic ...................... B64D 29/06 |
| 9,169,678 | B2 * | 10/2015 | Rozema .................... E05B 5/00 |
| 9,353,559 | B2 | 5/2016 | Fabre et al. |
| 9,415,876 | B1 * | 8/2016 | Baic ...................... B64D 29/06 |
| 9,650,807 | B2 * | 5/2017 | Helsley .................. E05B 35/008 |
| 9,752,358 | B2 * | 9/2017 | Powell .................. E05B 85/103 |
| 2002/0000726 | A1 | 1/2002 | Zintler |
| 2002/0060459 | A1 | 5/2002 | Zintler |
| 2002/0195827 | A1 * | 12/2002 | Jackson ................ B64D 29/06 292/219 |
| 2005/0087996 | A1 | 4/2005 | Jackson et al. |
| 2006/0049560 | A1 * | 3/2006 | Chun ...................... F16F 1/041 267/169 |
| 2006/0214431 | A1 | 9/2006 | Helsley et al. |
| 2008/0129056 | A1 | 6/2008 | Hernandez et al. |
| 2011/0101710 | A1 * | 5/2011 | Elbrecht ............... E05B 13/002 292/202 |
| 2011/0109103 | A1 | 5/2011 | Huston et al. |
| 2012/0102842 | A1 | 5/2012 | Fournie et al. |
| 2012/0151724 | A1 | 6/2012 | DeFrance et al. |
| 2012/0242096 | A1 * | 9/2012 | Rozema .................... E05B 5/00 292/202 |
| 2012/0242097 | A1 | 9/2012 | Hernandez |
| 2014/0035296 | A1 * | 2/2014 | Jackson ................ B64D 29/06 292/194 |
| 2015/0184543 | A1 | 7/2015 | Fabre et al. |
| 2015/0184544 | A1 | 7/2015 | Fabre et al. |
| 2015/0232189 | A1 * | 8/2015 | Hernandez ............. B64D 29/06 292/200 |
| 2016/0097223 | A1 * | 4/2016 | Rosales .................. E05B 77/12 292/92 |

FOREIGN PATENT DOCUMENTS

| | | |
|---|---|---|
| DE | 202220 C | 9/1908 |
| DE | 29807738 U1 | 7/1998 |
| EP | 1091059 A2 | 4/2001 |
| EP | 2031157 A1 | 3/2009 |
| EP | 2551199 A1 | 1/2013 |
| FR | 2397503 A1 | 2/1979 |
| FR | 2852049 A1 | 9/2004 |
| GB | 191493 A | 1/1923 |
| GB | 1497982 A | 1/1978 |
| GB | 1537410 A | 12/1978 |
| WO | 2010033026 A1 | 3/2010 |
| WO | 2010149905 A1 | 12/2010 |
| WO | 2011069103 A1 | 6/2011 |
| WO | 2012096986 A1 | 7/2012 |

OTHER PUBLICATIONS

Fairchild Fasteners, Aerospace Mechanisms, "RAM™ Aerospace Latch Mechanism", 2000 (4 pages).

(56) References Cited

OTHER PUBLICATIONS

Rotary Latch #TL18261, Alcoa Fastening Systems, Mar. 2005 (1 page).
English-language translation of WO 2010/149905 A1 (8 pages).
International Search Report and Written Opinion dated Jul. 20, 2012, issued by the European Patent Office in connection with International Patent Application No. PCT/US2012/028418 entitled "Pin Latch Having Ntermediate Position" (13 pages).
International Search Report and Written Opinion dated Jan. 18, 2013, issued by the European Patent Office in connection with International Patent Application No. PCT/US2012/059206 entitled "Rotary-Handle Latch" (9 pages).
International Search Report and Written Opinion dated Feb. 25, 2013, issued by the European Patent Office in connection with International Patent Application No. PCT/US2012/066039 entitled "Pin Latch With Detection Device and Movable Catch-Pin and Intermediate Position With Automatic Return Mechanism" (15 pages).
International Search Report and Written Opinion dated Dec. 29, 2011, issued by the European Patent Office in connection with International Patent Application No. PCT/US2011/027871 entitled "Latch With Adjustable Handle" (17 pages).
International Search Report and Written Opinion dated Jul. 15, 2011, issued by the European Patent Office in connection with International Patent Application No. PCT/US2011/027671 entitled "Latch With Adjustable Handle" (8 pages).
International Search Report and Written Opinion dated Jun. 7, 2011, issued by the European Patent Office in connection with International Patent Application No. PCT/US2011/024031 entitled "Side-Driven Action Pin Latch" (9 pages).
International Search Report and Written Opinion dated Jun. 9, 2016, issued by the European Patent Office in connection with International Patent Application No. PCT/US2016/024836 (13 pages).
Alcoa Fastening Systems, Document TL22028 Rev. P, dated Jun. 18, 2015 (2 pages).
International Search Report and Written Opinion dated Oct. 18, 2016, issued by the European Patent Office in International Patent Application No. PCT/US2016,048274 filed Aug. 24, 2016 (12 pages).

* cited by examiner

ADJUSTABLE PRESSURE RELIEF LATCH

CROSS-REFERENCE TO RELATED APPLICATION

This application is a Section 111(a) application relating to and claiming the benefit of commonly-owned, U.S. Provisional Patent Application Ser. No. 62/210,135, filed Aug. 26, 2015, entitled "FINE-TUNED, ADJUSTABLE LOAD PRESSURE RELIEF LATCH," the content of which is incorporated herein by reference in its entirety.

FIELD OF THE INVENTION

The present invention relates to latches and, more particularly, pressure relief latches.

BACKGROUND OF THE INVENTION

Removable and moveable elements installed on exterior surfaces of aerospace vehicles, such as hatches, doors, access panels, engine cowlings, nacelles, and radomes employ latches. What is desirable is a latch that can be opened automatically when a defined load is reached.

SUMMARY OF THE INVENTION

The present invention relates to a fine-tuned, adjustable load, pressure relief latch that provides a fine-tuned, load-range capability. The pressure relief latch is used to ensure that a door to an aircraft engine compartment can be opened when a high pressure is built up inside the compartment and to prevent loss of an aircraft engine. The pressure relief latch can be fine-tuned to a required load as close as possible at an assembly level. The pressure relief latch includes a tool access such that the tool (e.g., a standard, flat-head screw driver) will not be damaged or broken. In an embodiment, the latch is adapted for use in the aerospace field, such as aerospace doors, nacelles, etc. In other embodiments, the latch can be used in other fields and applications.

In an embodiment, a latch including a housing having a first end, a second end opposite the first end, first and second side members, each of which includes an outer surface, an inner surface, and an elongated slot extending from the outer surface to the inner surface and between the first and second ends, the first and second side members forming a space between the inner surfaces thereof, a base portion positioned at the second end and including first and second coves, each of which is positioned adjacent to an outer surface of a corresponding one of the first and second side members, the base portion including a first slot located intermediate the first and second coves and extending to the space, and a mounting portion positioned at the first end and including a second slot and extending to the space; a bolt mounted rotatably to the housing proximate to the first end thereof and positioned between the first and second side members of the housing, the bolt including a curvilinear portion, a first end located on the curvilinear portion, a linear portion, and a second end located on the linear portion, the bolt being moveable rotatably between a first position, in which the linear portion of the bolt extends through the space and the second end of the bolt extends through and protrudes from the second slot of the mounting portion of the housing, and a second position, in which the curvilinear portion of the bolt extends through and protrudes from the second slot and the linear portion is positioned external of the second slot; first and second compression springs, one of which is positioned within the first cove of the housing and the other of which is positioned within the second cove of the housing, each of the first and second compression springs including an end cap; an adjustment mechanism positioned within the housing intermediate the first and second compression springs, wherein the adjustment mechanism includes a third compression spring, a center cap located at one end of the third compression spring, and a nut positioned at an opposite end of the third compression spring; and a pin and roller extending through the end caps of the first and second compression springs and the center cap of the third compression spring, the pin and roller being positioned slidably within the elongated slots of the first and second side members of the housing.

In an embodiment, the nut is attached threadedly to the second end of the housing. In an embodiment, a load of the nut on the third compression spring is adapted to be adjusted by turning the nut relative to a longitudinal axis of the housing. In an embodiment, the nut is further secured to the housing by a cotter pin.

In an embodiment, the bolt includes a notch formed within the linear portion thereof and adjacent to one end of the curvilinear portion, and wherein the bolt notch is adapted to receive the pin and the roller when the bolt is in its first position. In an embodiment, the bolt is mounted rotatably to the housing by a rivet. In an embodiment, the bolt is adapted to be rotated from its second position to its first position by providing pressure on the second end of the bolt and rotating the bolt to make contact with the pin and roller and pushing to pin and roller away until the pin and roller engages the notch of the bolt. In an embodiment, the bolt is adapted to be rotated from its first position to its second position when a defined load is provided on the first end of the bolt, such that the bolt pushes the pin and roller in the elongated slots of the side members of the housing and loaded by the first, second, and third compression springs. In an embodiment, the bolt is adapted to be rotated from its second position to its first position by providing pressure on the second end of the bolt and rotating the bolt to make contact with the pin and roller and pushing to pin and roller away until the pin and roller engages the notch of the bolt.

In an embodiment, a latch including a housing having a first end, a second end opposite the first end, first and second side members, each of which includes an outer surface, an inner surface, and an elongated slot extending from the outer surface to the inner surface and between the first and second ends, the first and second side members forming a space between the inner surfaces thereof, a base portion positioned at the second end and including first and second coves, each of which is positioned adjacent to an outer surface of a corresponding one of the first and second side members, the base portion including a first slot located intermediate the first and second coves and extending to the space, and a mounting portion positioned at the first end and including a second slot and extending to the space; a bolt mounted rotatably to the housing proximate to the first end thereof and positioned between the first and second side members of the housing, the bolt including a curvilinear portion, a first end located on the curvilinear portion, a linear portion, and a second end located on the linear portion, the bolt being moveable rotatably between a first position, in which the linear portion of the bolt extends through the space and the second end of the bolt extends through and protrudes from the second slot of the mounting portion of the housing, and a second position, in which the curvilinear portion of the bolt extends through and protrudes from the second slot and the linear portion is positioned external of the second slot; an adjustment mechanism positioned within the housing and including a compression spring, a center cap located at one end of the compression spring, and a nut positioned at an opposite end of the compression spring; and a pin and roller extending through the center cap of the compression spring, the pin and roller being positioned slidably within the elongated slots of the first and second side members of the housing.

DETAILED DESCRIPTION OF THE DRAWINGS

Figure 1:
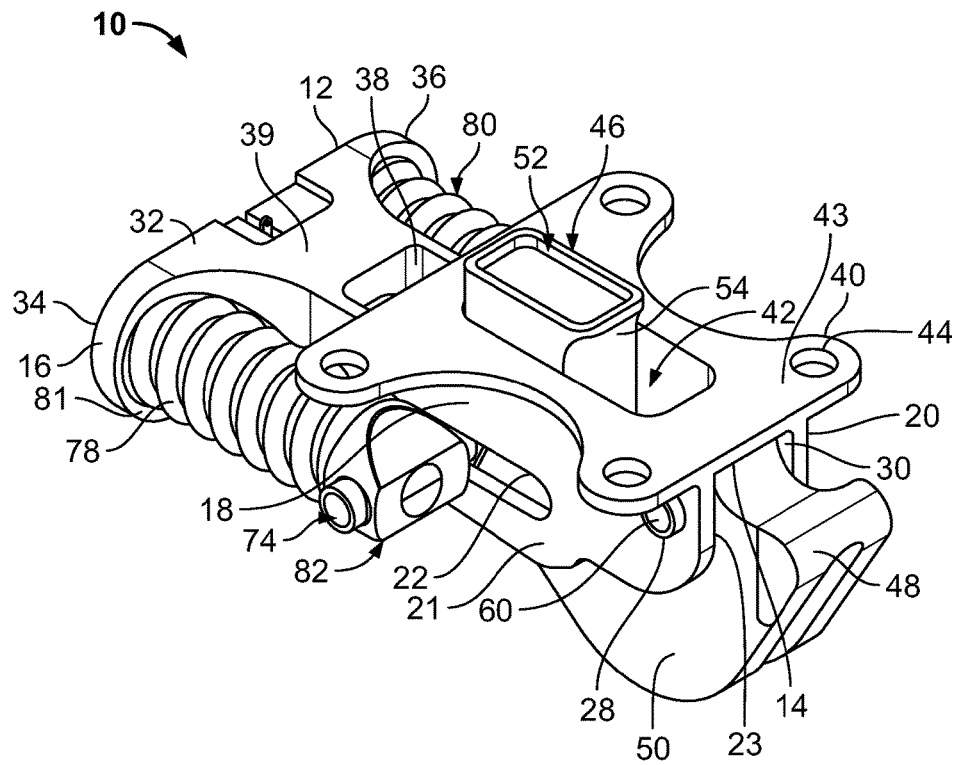
FIG. 1 is a top perspective view of an embodiment of a pressure relief latch shown in a closed position.
Figure 2:
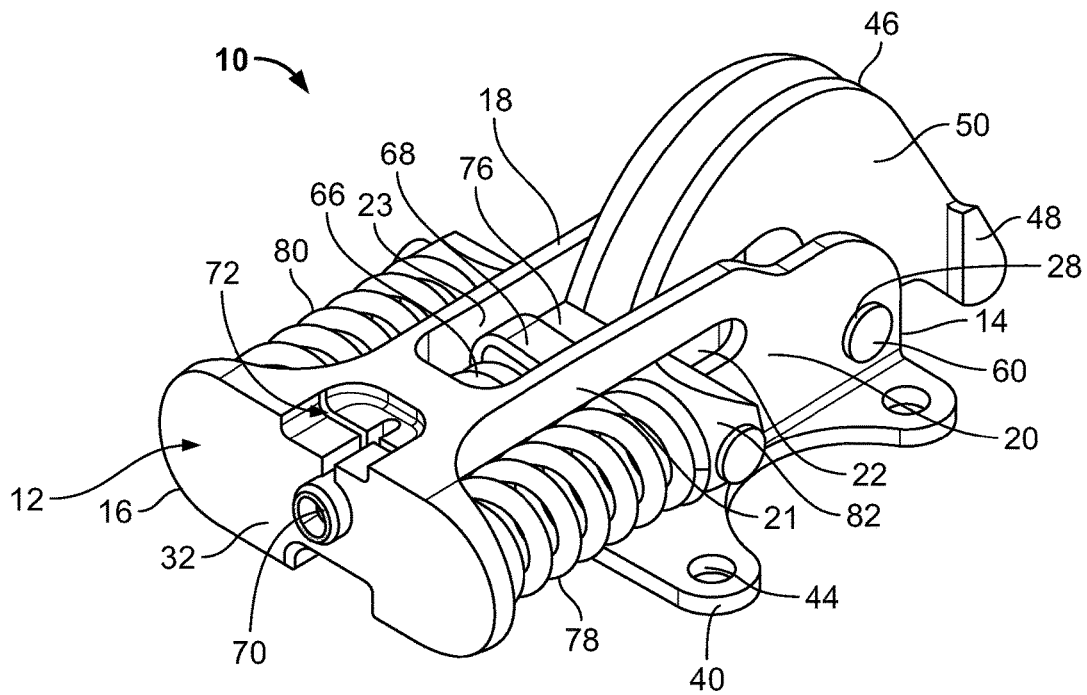
FIG. 2 is a bottom perspective view of the pressure relief latch shown in FIG. 1.
Figure 3:
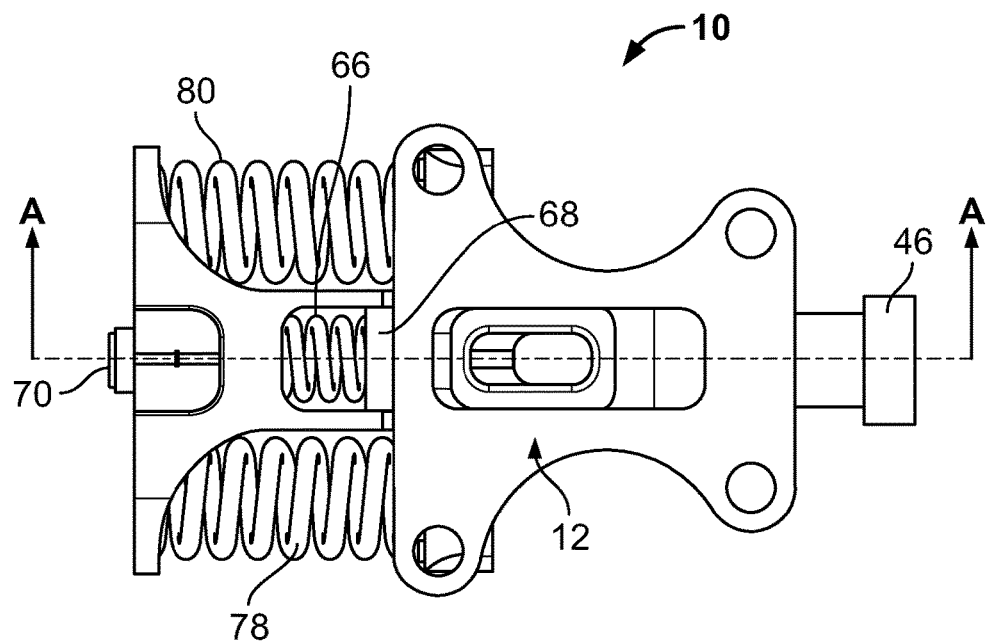
FIG. 3 is a top plan view of the pressure relief latch shown in FIG. 1.
Figure 4:
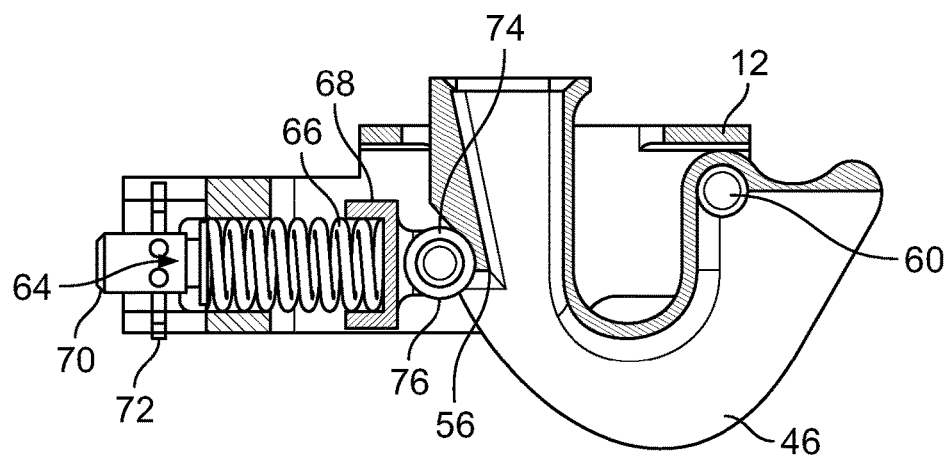
FIG. 4 is a side cross-sectional view, taken along lines A-A and looking in the directions of the arrows, of the pressure relief latch shown in FIG. 3.

Referring to FIGS. 1 through 4, in an embodiment, a pressure relief latch 10 includes a housing 12 having a first end 14 and a second end 16 opposite the first end 14. The housing 12 includes first and second side members 18, 20, each of which extends from the first end 14 to the second end 16 and includes an outer surface 21, an inner surface 23 opposite the outer surface 21, an elongated slot 22 extending from the outer surface 21 to the inner surface 23 and intermediate the first and second ends 14, 16, and a hole 28 located proximate to the first end 14 and extending from the outer surface 21 to the inner surface 23. A space 30 is formed between the inner surfaces 23 of the first and second side members 18, 20. In an embodiment, the housing 12 further includes a base portion 32 formed at the second end 16 thereof. The base portion 32 includes first and second coves 34, 36 each of which is positioned adjacent to the outer surface 21 of a corresponding one of the first and second side members 18, 20. The base portion 32 further includes a slot 38 located intermediate the coves 34, 36 and extending from an upper surface 39 of the base portion 32 to the space 30. In an embodiment, the slot 38 is substantially rectangular in shape. The housing 12 further includes a mounting portion 40 having a slot 42 that extends from an upper surface 43 of the mounting portion 40 to the space 30, and a plurality of mounting holes 44. In an embodiment, the slot 42 is substantially rectangular in shape.

In an embodiment, the pressure relief latch 10 includes a bolt 46. In an embodiment, the bolt 46 is J-shaped. In other embodiments, the bolt 46 can have a U-shape or any other suitable shape. In an embodiment, the bolt 46 includes a first end 48 located on an arcuate/curvilinear portion 50 and a second end 52 located on a linear portion 54. In an embodiment, the bolt 46 includes a bolt notch 56 formed within the linear portion 54 and adjacent to one end of the curvilinear portion 50 (see FIG. 4). In an embodiment, the bolt 46 is mounted rotatably to the housing 12 such that the first end 48 of the bolt 46 is mounted to the first end 14 of the housing 12 by a rivet 60, which is inserted within the hole 28. In an embodiment, the linear portion 54 of the bolt 46 extends through the space 30 when the bolt 46 is in a first position, and the second end 52 of the bolt 46 extends through and protrudes from the slot 42 of the mounting portion 40 when the bolt 46 is in its first position.

In an embodiment, the pressure relief latch 10 includes an adjustment mechanism 64 that is positioned within the interior of the housing 12 and intermediate first and second compression springs 78, 80, which shall be described below, and along the longitudinal axis of the latch 10. In an embodiment, the adjustment mechanism 64 includes a center compression spring 66, a center cap 68 positioned at one end of the compression spring 66, a pin 74 and a roller 76 attached to the center cap 68, and extending through the elongated slots 22, and an adjusting nut 70 positioned at an opposite end of the compression spring 66. In an embodiment, the adjusting nut 70 is attached threadedly to the second end 16 of the housing 12, and is additionally secured thereto by a cotter pin 72. In an embodiment, the center cap 68 and the roller 76 pivot about the pin 74 which is guided by the slots 22 of the housing 12. In an embodiment, the pin 74 and the roller 76 combination are sized and shaped to engage the bolt notch 56 of the bolt 46 when the latch 10 is in its closed position.

In an embodiment, the pressure relief latch 10 includes the first and second compression springs 78, 80 each of which is positioned within a corresponding one of the coves 34, 36 of the base portion 32 of the housing 12. One end of each of the springs 78, 80 is positioned against a rear interior portion 81 of a corresponding one of the coves 34, 36 of the base portion 32, while the other end of each of the springs 78, 80 includes a corresponding side cap 82 mounted thereon, which receives a corresponding one of the pins 74. In an embodiment, the roller 76 is always in contact with the bolt 46 as a result of the load from the three compression springs 66, 78, 80.

In an embodiment, the load of the adjusting nut 70 on the center compression spring 66 may be adjusted with a tool, such as a standard hex wrench, screwdriver, or the like, by turning the nut 70 clockwise or counterclockwise, as applicable, relative to the longitudinal axis of the housing 12. Once the desired load is reached, the adjustment nut 70 is secured in place with the cotter pin 72.

Figure 5:
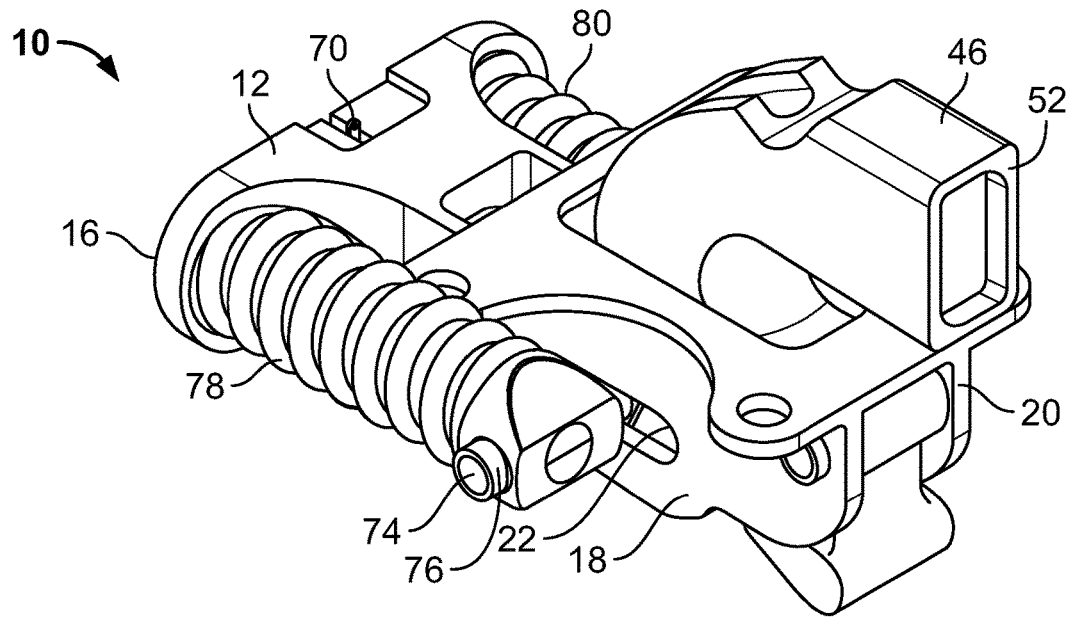
FIG. 5 is a top perspective view of the pressure relief latch shown in FIGS. 1 through 4, with the latch shown in an open position.
Figure 6:
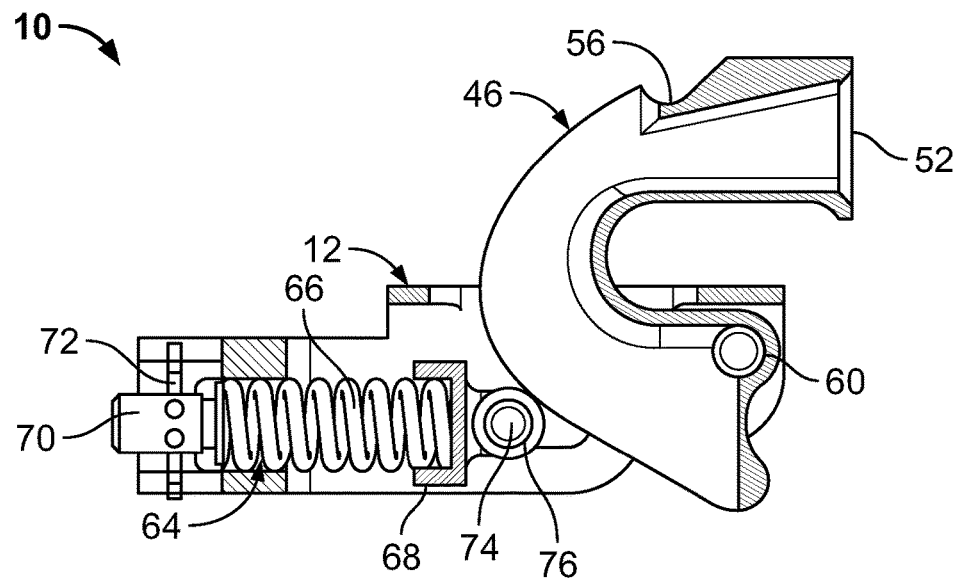
FIG. 6 is a side cross-sectional view of the pressure relief latch shown in FIG. 5.

Referring to FIGS. 5 and 6, in an embodiment, the latch 10 may be opened from its first, closed position to its second, open position under a defined load. As an example of a "defined load," when pressure builds up and reaches a defined pressure inside an engine compartment, the latch 10 pushes the engine compartment door open to release the pressure. When the defined load is reached, the bolt 46 rotates clockwise and pushes the pin 74 and the roller 76, which is guided by the pin 74, in the elongated slots 22 of the side members 18, 20 of the housing 12 toward the second end 16 of the housing 12 and loaded by the compression springs 66, 78, 80 away until the roller 76 disengages the bolt notch 56 of the bolt 46. The roller 76 maintains contact with the bolt 46 under load by the compression springs 66, 78, 80 and forces the bolt 46 to rotate counterclockwise until the pin 74 stops against the ends of the slots 22 of the housing 12. The compression springs 66, 78, 80 then collapse and cause the center cap 68 and the pin 74 and the roller 76 to move only in one direction, which is a direction away from the bolt 46 and toward the second end 16 of the housing 12.

In an embodiment, from its open position, the latch 10 can be closed either by a standard tool, such as a flat-head screwdriver, or manually by finger pressure on the second end 52 of the bolt 46, which pivots about the rivet 60 to rotate counterclockwise. In this regard, when the bolt 46 makes contact with the roller 76, the bolt 46 pushes the pin 74 and the roller 76 away until the roller 76 engages the bolt notch 56 of the bolt 46. The bolt 46 is then retained in closed position.

It should be understood that the embodiments described herein are merely exemplary and that a person skilled in the art may make many variations and modifications without departing from the spirit and scope of the invention. All such variations and modifications are intended to be included within the scope of the invention as defined in the appended claims.

What is claimed is:

1. A latch, comprising:
    a housing having a first end, a second end opposite the first end, first and second side members, each of which includes an outer surface, an inner surface, and an elongated slot extending from the outer surface to the inner surface and between the first and second ends, the first and second side members forming a space between the inner surfaces thereof, a base portion positioned at the second end and including first and second coves, each of which is positioned adjacent to an outer surface of a corresponding one of the first and second side members, the base portion including a first slot located intermediate the first and second coves and extending to the space, and a mounting portion positioned at the first end and including a second slot and extending to the space;
    a bolt mounted rotatably to the housing proximate to the first end thereof and positioned between the first and second side members of the housing, the bolt including a curvilinear portion, a first end located on the curvilinear portion, a linear portion, and a second end located on the linear portion, the bolt being moveable rotatably between a first position, in which the linear portion of the bolt extends through the space and the second end of the bolt extends through and protrudes from the second slot of the mounting portion of the housing, and a second position, in which the curvilinear portion of the bolt extends through and protrudes from the second slot and the linear portion is positioned external of the second slot, the first end of the bolt being adapted to engage an external structure when the bolt is in its first position;
    first and second compression springs, one of which is positioned within the first cove of the housing and the other of which is positioned within the second cove of the housing, each of the first and second compression springs including an end cap;
    an adjustment mechanism positioned within the housing intermediate the first and second compression springs, wherein the adjustment mechanism includes a third compression spring, a center cap located at one end of the third compression spring, and a nut positioned at an opposite end of the third compression spring; and
    a pin and roller extending through the end caps of the first and second compression springs and the center cap of the third compression spring, the pin and roller being positioned slidably within the elongated slots of the first and second side members of the housing.

2. The latch of claim 1, wherein the nut is attached threadedly to the second end of the housing.

3. The latch of claim 2, wherein a load of the nut on the third compression spring is adapted to be adjusted by turning the nut relative to a longitudinal axis of the housing.

4. The latch of claim 3, wherein the nut is further secured to the housing by a cotter pin.

5. The latch of claim 3, wherein the bolt includes a notch formed within the linear portion thereof and adjacent to one end of the curvilinear portion, and wherein the bolt notch is adapted to receive the pin and the roller when the bolt is in its first position.

6. The latch of claim 5, wherein the bolt is mounted rotatably to the housing by a rivet.

7. The latch of claim 6, wherein the bolt is adapted to be rotated from its second position to its first position by providing pressure on the second end of the bolt and rotating the bolt to make contact with the pin and roller and pushing to pin and roller away until the pin and roller engages the notch of the bolt.

8. The latch of claim 7, wherein the bolt is adapted to be rotated from its first position to its second position when a load is provided on the first end of the bolt, such that the bolt pushes the pin and roller in the elongated slots of the side members of the housing and loaded by the first, second, and third compression springs.

9. The latch of claim 8, wherein the bolt is adapted to be rotated from its second position to its first position by providing pressure on the second end of the bolt and rotating the bolt to make contact with the pin and roller and pushing to pin and roller away until the pin and roller engages the notch of the bolt.

10. A latch, comprising:
    a housing having a first end, a second end opposite the first end, first and second side members, each of which includes an outer surface, an inner surface, and an elongated slot extending from the outer surface to the inner surface and between the first and second ends, the first and second side members forming a space between the inner surfaces thereof, a base portion positioned at the second end and including first and second coves, each of which is positioned adjacent to an outer surface of a corresponding one of the first and second side members, the base portion including a first slot located intermediate the first and second coves and extending to the space, and a mounting portion positioned at the first end and including a second slot and extending to the space;
    a bolt mounted rotatably to the housing proximate to the first end thereof and positioned between the first and second side members of the housing, the bolt including a curvilinear portion, a first end located on the curvilinear portion, a linear portion, and a second end located on the linear portion, the bolt being moveable rotatably between a first position, in which the linear portion of the bolt extends through the space and the second end of the bolt extends through and protrudes from the second slot of the mounting portion of the housing, and a second position, in which the curvilinear portion of the bolt extends through and protrudes from the second slot and the linear portion is positioned external of the second slot, the first end of the bolt being adapted to engage an external structure when the bolt is in its first position;
    an adjustment mechanism positioned within the housing and including a compression spring, a center cap located at one end of the compression spring, and a nut positioned at an opposite end of the compression spring; and
    a pin and roller extending through the center cap of the compression spring, the pin and roller being positioned slidably within the elongated slots of the first and second side members of the housing.

11. The latch of claim 10, wherein the nut is attached threadedly to the second end of the housing.

12. The latch of claim 11, wherein a load of the nut on the compression spring is adapted to be adjusted by turning the nut relative to a longitudinal axis of the housing.

13. The latch of claim 12, wherein the nut is further secured to the housing by a cotter pin.

14. The latch of claim 12, wherein the bolt includes a notch formed within the linear portion thereof and adjacent to one end of the curvilinear portion, and wherein the bolt notch is adapted to receive the pin and the roller when the bolt is in its first position.

15. The latch of claim 14, wherein the bolt is mounted rotatably to the housing by a rivet.

16. The latch of claim 15, wherein the bolt is adapted to be rotated from its second position to its first position by providing pressure on the first end of the bolt and rotating the bolt to make contact with the pin and roller and pushing to pin and roller away until the pin and roller engages the notch of the bolt.

17. The latch of claim 16, wherein the bolt is adapted to be rotated from its first position to its second position when a defined load is provided on the first end of the bolt, such that the bolt pushes the pin and roller in the elongated slots of the side members of the housing and loaded by the compression spring.

18. The latch of claim 17, wherein the bolt is adapted to be rotated from its second position to its first position by providing pressure on the first end of the bolt and rotating the bolt to make contact with the pin and roller and pushing to pin and roller away until the pin and roller engages the notch of the bolt.

* * * * *